United States Patent [19]

Craig et al.

[11] Patent Number: 4,660,093
[45] Date of Patent: Apr. 21, 1987

[54] TELEVISION RECEIVER WITH DELAYED DISPLAY

[75] Inventors: Randy W. Craig; Thomas D. Gurley, both of Indianapolis, Ind.

[73] Assignee: RCA Corporation, Princeton, N.J.

[21] Appl. No.: 861,302

[22] Filed: May 9, 1986

[51] Int. Cl.$^4$ .................. H04N 5/68; H04N 5/63; H04N 9/20
[52] U.S. Cl. .................. 358/243; 358/65; 358/74; 358/190
[58] Field of Search .................. 358/242, 243, 29, 34, 358/64, 65, 74, 171, 184, 190

[56] References Cited

U.S. PATENT DOCUMENTS

| | | | |
|---|---|---|---|
| 4,263,622 | 4/1981 | Hinn | 358/74 |
| 4,277,798 | 7/1981 | Hinn | 358/65 |
| 4,331,981 | 5/1982 | Parker | 358/243 |
| 4,331,982 | 5/1982 | Parker | 358/243 |
| 4,450,476 | 5/1984 | Tallant, II | 358/74 |

*Primary Examiner*—Tommy P. Chin
*Attorney, Agent, or Firm*—P. J. Rasmussen; P. M. Emanuel; R. H. Kurdyla

[57] ABSTRACT

In a color television receiver including a color kinescope and plural kinescope driver stages, a control circuit is included for inhibiting the operation of the driver stages for a short interval after the receiver is energized, particularly under "hot start" conditions, to prevent disturbing artifacts from being displayed by the kinescope. In an illustrated embodiment the driver stages are disabled in response to a control signal applied to a bias point common to the plural driver stages.

8 Claims, 1 Drawing Figure

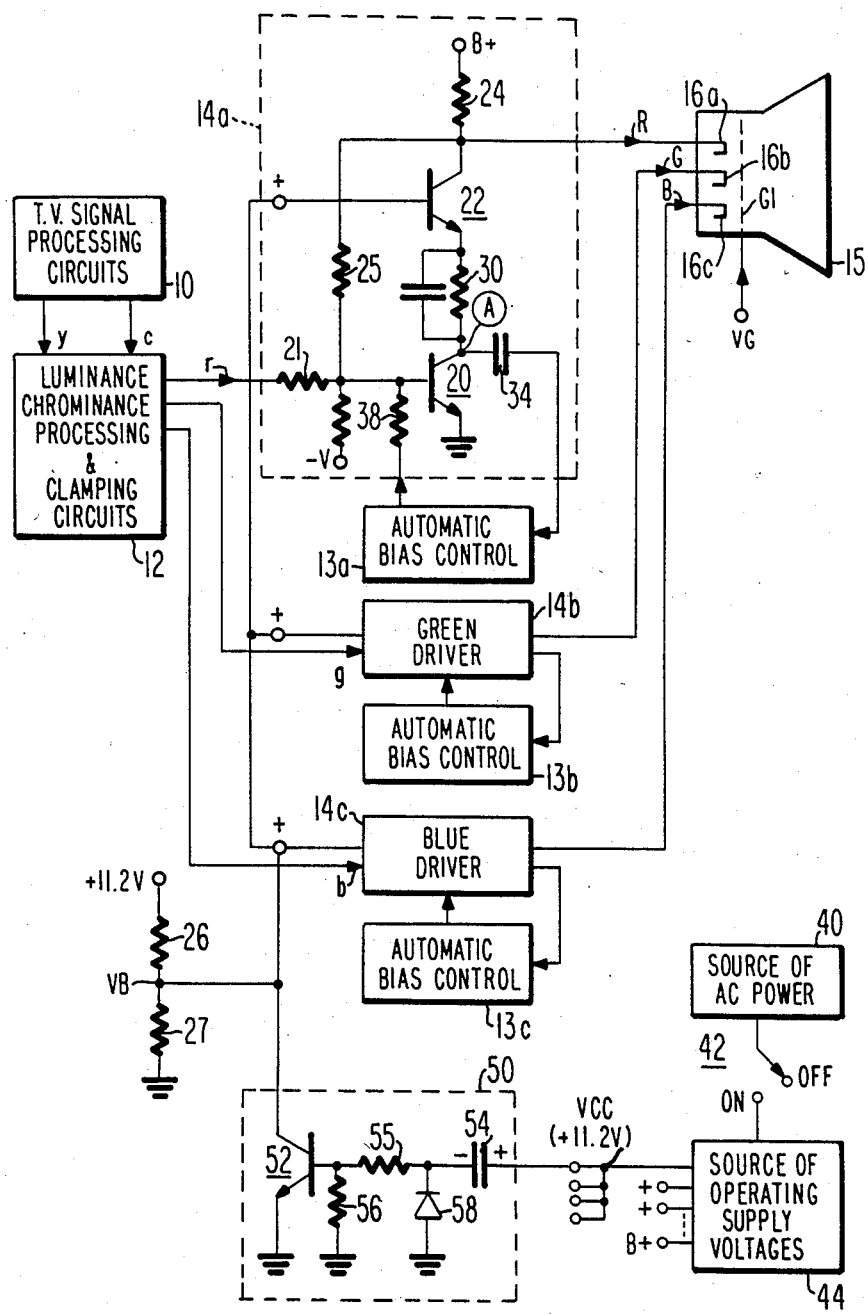

TELEVISION RECEIVER WITH DELAYED DISPLAY

This invention concerns a video signal processing and display system, such as a television receiver, wherein the display of video information is inhibited for a given time interval after the receiver is energized.

It has been observed that some color television receivers may display artifacts which are disturbing to a viewer, particularly during a "hot start" when the receiver is re-energized shortly after having been turned off. A "hot start" is a condition where the receiver is turned on before the filaments of an image displaying kinescope have had a chance to cool off, e.g., within about two minutes.

The disturbing artifacts displayed after a "hot start" can assume many forms. In one case a kinescope was seen to display a bright blue field, followed by a bright red field, before the system settled down to a normal display condition, i.e., normal video information or a black field in the absence of video information. Some receivers delay the vertical scanning of the kinescope for a few seconds after the receiver is energized to improve kinescope degaussing by eliminating interaction between the vertical deflection field and the degaussing coil. In this case the disturbing displayed artifacts which appear after a hot start appear, for example, as intense red then blue lines followed afterwards by an intense white line. In this case a line rather than a full screen field display occurs because inhibited vertical scanning results in a vertical field compressed to a horizontal line with magnified intensity. In addition to being objectionable to a viewer, the described intense lines may produce kinescope screen burn if the automatic kinescope beam current limiter network of the receiver is unable to limit the beam currents associated with such displayed intense lines.

The described disturbing artifacts can be attributable to a variety of causes. In one case, for example the cause has been traced to the operation of plural clamping circuits respectively associated with red, green and blue video signal processing circuits preceding the display device. Each such clamp may include keyed comparators with associated storage capacitors for establishing a desired DC bias condition for the color signal processing path it acts upon. However, the color signal clamps may operate erratically due to improper biasing during the short interval after the receiver is energized, i.e., before the receiver power supplies have stabilized. Erratic clamp operation before proper biasing is achieved, coupled with circuit tolerances and the discharging characteristics of the clamp storage capacitors, appear to be responsible for the disturbing display artifacts mentioned above.

Accordingly, there is disclosed herein apparatus for preventing the described disturbing artifacts from being displayed. In accordance with the principles of the present invention, this is accomplished by decoupling the kinescope signal inputs for display purposes for a given short time period when the receiver is energized, particularly under "hot start" conditions.

In a disclosed preferred embodiment of the invention, the signal inputs of a color kinescope are driven by a cascode display driver amplifier comprising plural signal input common emitter amplifier transistors, and respectively associated plural signal output common base amplifier transistors each having a bias input coupled to a common source of bias potential. The normal biasing of the signal output transistors is disrupted for a given short time interval after the receiver is energized, thereby preventing the output transistors from conveying video signals to the kinescope.

The single Figure of the drawing depicts a portion of a color television receiver including display control apparatus in accordance with the principles of the present invention.

Television signal processing circuits 10 provide separated luminance (Y) and chrominance (C) components of a composite color television signal to luminance-chrominance signal processing and clamping circuits 12. Processor 12 includes luminance and chrominance gain control circuits, DC level setting circuits, color demodulators for developing r-y, g-y and b-y color difference signals, matrix amplifiers for combining the latter signals with processed luminance signals to provide low level color image representative output signals r, g and b, and plural clamping circuits, e.g., clamping comparator circuits of the type described in U.S. Pat. No. 4,554,588—R. L. Shanley for establishing a desired DC condition for each of the r, g and b signals. Clamping comparator circuits of this type are employed in the CTC-131 color television receiver chassis manufactured by RCA Corporation, specifically in a luminance-chrominance signal processing integrated circuit as shown in the Basic Service Data publication (1984, second edition, CTC-131) for this receiver. The r, g and b signals are respectively amplified by red, green and blue video output kinescope display driver amplifiers 14a, 14b and 14c of similar configuration as that shown for red driver 14a. Drivers 14a, 14b and 14c provide high level amplified color image signals R, G and B to respective cathode intensity control electrodes 16a, 16b and 16c of a color kinescope 15. In this instance kinescope 15 is of the self-converging, "in-line" gun type with a commonly energized G1 grid electrode associated with each of the kinescope electron guns comprising cathode electrodes 16a, 16b and 16c.

Driver 14a includes a common emitter input amplifier transistor 20 which receives input signal r via a resistor 21, and a high voltage common base output amplifier transistor 22 which forms a cascode video output display driver amplifier stage with input transistor 20. High level video signal R suitable for driving kinescope cathode 16a is developed across a load resistor 24 in the collector output circuit of transistor 22. A high operating voltage for driver 20, 22 is provided by a source of positive DC potential B+ (e.g., +230 volts) coupled to the collector circuit of transistor 22. Direct current negative feedback is provided from the collector output of transistor 22 to the base input of transistor 20 by means of a feedback resistor 25. Normal bias for the base electrode of output transistor 22 is provided by a bias voltage source comprising voltage divider resistors 26 and 27 coupled between a source of operating potential (+11.2 v) and ground. A bias voltage VB developed at the junction of resistors 26 and 27 is coupled in common to each of the base electrodes of the output transistors of driver stages 14a, 14b and 14c.

Automatic kinescope bias (AKB) control networks 13a, 13b and 13c are respectively associated with each of driver stages 14a, 14b and 14c. The automatic bias control networks exhibit similar structure and operating characteristics and serve to maintain a desired black level DC bias for the respective cathodes of kinescope 15. A sensing resistor 30 in series with driver transistors 20, 22 acts in conjunction with the AKB system by developing a voltage at a sensing node A representative of the kinescope cathode black current level conducted during image blanking intervals in response to a positive grid drive pulse VG applied to grid electrode G1 during prescribed portions of vertical blanking intervals as explained, for example, in U.S. Pat. Nos. 4,263,622 and 4,277,798, both of Werner Hinn.

Briefly, during each AKB interval, positive pulse VG forward biases grid G1, thereby causing the electron gun comprising cathode 16a and grid G1 to increase conduction. In response to grid pulse VG, a similarly phased, positive current pulse appears at cathode 16a during the grid pulse interval. The amplitude of the cathode output current pulse is proportional to the level of cathode black current conduction (typically a few microamperes). The induced positive cathode output pulse appears at the collector of transistor 22. This pulse is fed back to the base input of transistor 20 through resistor 25, causing the current conduction of transistor 20 to increase proportionally while the cathode pulse is present. The increased current conducted by transistor 20 causes a voltage to be developed across sensing resistor 30. This voltage is in the form of a negative-going voltage pulse which appears at sensing node A and which is proportional in magnitude to the magnitude of the black level representative cathode output pulse.

The recovered black current representative voltage pulse is coupled from node A via an AC coupling capacitor 34 to a sampling and control signal processing circuits in bias control network 13a. Keyed sample and hold circuits within network 13a are enabled by a sampling timing signal for developing a DC bias control voltage proportional to the magnitude of the voltage pulse developed at node A. The bias control voltage is stored and is applied via a resistor 38 to a bias control input at the base of transistor 20 for maintaining a desired cathode bias voltage corresponding to a desired black level cathode current. Illustratively, if the magnitude of the induced cathode output pulse corresponds to a condition of excessive black current the bias control voltage decreases to thereby increase the bias voltage of cathode 16a at the collector of transistor 22. This reduces the black current level to the correct level. Networks 13a, 13b and 13c can employ signal sample and hold networks of the type described in U.S. Pat. No. 4,331,981 and U.S. Pat. No. 4,331,982, both of R. P. Parker, and can also employ sampling and control voltage processing circuits of the type shown in U.S. Pat. No. 4,277,798 of Werner Hinn.

The television receiver is energized in response to plural receiver operating supply voltages provided from a source 44 when source 44 is energized from a source of AC power 40 when a viewer operated power switch 42 is placed in the "ON" position. The operating voltages from source 44 include supply voltages for signal processing circuits of the receiver as well as operating voltages for kinescope 15 (e.g., including filament heater and very high anode voltages). In particular, source 44 provides an operating voltage VCC of +11.2 volts for various signal processing circuits and from which the bias voltage for the base electrodes of the common base output transistors (e.g., transistor 22) is derived.

In accordance with the principles of the present invention, a timing circuit 50 serves to modify the base bias voltage of the output transistors when the receiver is energized, as will be described below. Circuit 50 includes a switching transistor 52 with a collector output coupled to the junction of bias supply resistors 26 and 27 and to the base electrodes of the common base output transistors of each display driver stage. The base input electrode of transistor 52 is coupled to bias potential VCC via a series capacitor 54 and a resistor network including a series resistor 55 and a shunt resistor 56. A normally nonconductive diode 58 is coupled from the negative (−) terminal of capacitor 54 to a point of reference potential (ground).

After the receiver has been operating for a while in a steady state condition, capacitor 5 is charged to 11.2 volts. At this time transistor 52 is non-conductive and the display driver stages operate normally to provide video signals to the kinescope. When the receiver is then turned off via switch 42, the level of voltage VCC from source 44 decreases rapidly. Diode 58 conducts, and the negative terminal of capacitor 54 is clamped to a voltage of −0.7 volts, i.e., one diode offset voltage drop below ground reference potential. Capacitor 54 is discharged rapidly via a discharge path including the positive terminal of capacitor 54, a load impedance (not shown) exhibited between the VCC voltage terminal of source 44 and ground, the anode of diode 58 and the negative terminal of capacitor 54. With the receiver off, a voltage of approximately 0.7 volts appears across capacitor 54.

The receiver may be re-energized a short time, e.g. within one or two minutes, after being turned off. This corresponds to a "hot start" condition wherein the kinescope cathodes remain hot or warm and are capable of immediate emission such that the kinescope can produce an image display immediately. The VCC operating potential appears quickly. The positive and negative terminals of capacitor 54 then exhibit voltages of +11.2 volts and +10.5 volts, respectively, and diode 58 is nonconductive. The +10.5 volt potential at the negative terminal of capacitor 54 is conveyed via voltage divider resistors 55 and 56 to the base of transistor 52, causing it to conduct in a saturated state wherein the collector potential of transistor 52 (a few tenths of a volt) closely approximates its emitter potential of zero volts. Accordingly, the bias voltage at the junction of resistors 26 and 27 decreases and the base bias applied to the base electrodes of the video output transistors is now determined by the low collector potential of transistor 55, which is insufficient to maintain the video output transistors forward biased in a conductive state. The output transistors are thereby rendered nonconductive and the outputs of video signal processing circuits 12 are therefore decoupled from the kinescope cathodes. Any disturbing artifacts which would otherwise be developed as a consequence of a "hot start" condition are prevented from being displayed as long as transistor 52 is sufficiently conductive to prevent normal bias voltage VB from being developed at the base electrodes of the video output transistors.

Capacitor 54 eventually charges to +11.2 volts in accordance with a time constant determined by the values of resistors 55 and 56 and the value of capacitor 54. At such time, e.g., a few seconds after the "hot start" energization of the receiver, transistor 52 is rendered nonconductive and normal biasing of the base electrodes of the video output transistors returns, whereby these transistors are rendered conductive and the outputs from signal processing circuits 12 are coupled to the kinescope cathodes.

The described timing circuit is advantageously used with plural cascode display driver stages since in such case a common bias point is available at the base electrodes of the common base video output transistors for controlling the conductive state thereof via circuit 50. That is, only a single timing circuit 50 is needed. In addition, the connection of control circuit 50 to the base electrodes of the common base output transistors advantageously does not interfere with the signal processing characteristics of the display drivers, particularly with respect to the high frequency response thereof.

Due to the manner in which circuit 50 is connected, circuit 50 controls the conductive state of the display driver stages under both hot start conditions as described, and also under cold start conditions wherein the kinescope filaments and cathodes have had sufficient time to cool after the receiver has been turned off. However, the operation of circuit 50 under cold start conditions is not detrimental to the operation of the receiver. In this regard it is noted that the operation of the AKB system is allowed to begin immediately for both hot and cold start conditions. In some systems, for cold start conditions an excessively bright image may be produced initially due to AKB system action if the AKB system is enabled to operate immediately after a cold start, for reasons explained in U.S. Pat. No. 4,450,476—J. C. Tallant, II. To eliminate such excessively bright initial image display, the operation of the AKB system can be delayed after a cold start, as described in U.S. Pat. No. 4,450,476, by the use of an AKB "hold-off" circuit. It has been found that with the use of circuit 50 of the present disclosure the use of such an AKB "hold off" circuit can be dispensed with since after a cold start the display driver stages are enabled to conduct after a delay determined by the time constant of circuit 50. This delay in the conduction of the display driver stages prevents an excessively bright initial image display which in some systems would necessitate the use of an AKB hold-off circuit of the type described in the Tallant patent.

What is claimed is:

1. A video signal processing and display system comprising:

an image display device for displaying an image in response to an image representative video signal applied thereto;

means for applying said video signal to said display device;

means for supplying system operating voltages when said system is energized;

control means responsive to the energization of said system for generating a control signal for a prescribed interval upon energization of said system; and means for coupling said control signal to said applying means for preventing normal application of said video signal to said display device by said applying means to prevent said display device from displaying disturbing visual artifacts after a hot-start energization of said system.

2. A system according to claim 1 wherein said applying means is a display driver amplifier stage.

3. A system according to claim 2, wherein said display driver amplifier stage comprises a transistor with a signal input, a signal output and a bias input; and said control signal is applied to said bias input for modifying normal biasing of said transistor so as to inhibit normal operation of said transistor.

4. A system according to claim 2, wherein said display driver amplifier stage is a cascode amplifier having a signal input amplifier device, and a signal output amplifier device with a bias input; and said control signal is applied to said bias input for modifying normal biasing of said signal output amplifier device so as to render said signal output amplifier device nonconductive.

5. A system according to claim 2, wherein said image display device is a color image display device having plural signal inputs;

said display driver amplifier stage comprises plural cascode amplifier stages respectively associated with said plural signal inputs of said display device, each said cascode amplifier stage comprising a signal input amplifier device, and a signal output amplifier device having a bias input; and said control signal is coupled in common to said bias inputs of said signal output amplifier devices for modifying normal biasing of said plural signal output amplifier devices so as to render said plural signal output devices nonconductive during said prescribed interval.

6. A system according to claim 5, wherein each of said signal output amplifier devices is a transistor having input and output electrodes defining a main current conduction path of said signal output amplifier device, and a bias input electrode.

7. A system according to claim 1, wherein said image display device is a kinescope having a cathode signal input electrode for receiving said image representative video signal; and said system includes bias control means coupled to said kinescope for automatically controlling the bias of said kinescope.

8. A system according to claim 1, wherein said control means comprises:

a switching transistor having an output electrode coupled to said applying means, and an input electrode;

a capacitor having a first terminal coupled to an operating voltage developed by said supplying means, and a second terminal;

a resistive network for coupling said second terminal of said capacitor to said input electrode of said switching transistor; and a clamping diode coupled to said capacitor.

* * * * *